United States Patent [19]

Clay et al.

[11] 4,164,526

[45] Aug. 14, 1979

[54] NATURAL SANDWICH OF FILLED POLYURETHANE FOAM

[75] Inventors: Edward L. Clay, 9113 Park, Lenexa, Kans. 66215; Jerry L. Baker, Kansas City, Mo.

[73] Assignees: T. R. Baker; F. Walter McCarty, Jr.; Norman E. Jacobs; Edward N. Ludwikoski; C. Alex McBurney; Lawrence F. Steffen; The Cooper Corporation; H & K Sales Company, Inc.; Phoenix Royalty Associates, Inc.; Edward L. Clay

[21] Appl. No.: 844,131

[22] Filed: Oct. 20, 1977

Related U.S. Application Data

[63] Continuation of Ser. No. 599,653, Jul. 28, 1975, abandoned, which is a continuation of Ser. No. 346,912, Apr. 2, 1973, abandoned, which is a continuation-in-part of Ser. No. 247,029, Apr. 24, 1972, abandoned.

[51] Int. Cl.$^2$ .................... B29D 27/04; C08G 18/14; C08G 18/00; C08G 18/08
[52] U.S. Cl. ................... 264/45.3; 260/37 N; 264/45.5; 264/46.7; 264/DIG. 13; 264/DIG. 14; 264/DIG. 17; 428/218; 428/306; 428/308; 428/315; 521/51; 521/103; 521/120; 521/122; 521/123; 521/130; 521/131; 521/132
[58] Field of Search ............... 260/2.5 AZ, 2.5 AF, 260/2.5 AK, 2.5 AL; 264/DIG. 14, DIG. 17, DIG. 49, 45.3; 428/315, 306, 308, 218; 521/51

[56] References Cited

U.S. PATENT DOCUMENTS

| | | | |
|---|---|---|---|
| 3,150,109 | 9/1964 | Ferrigno | 260/2.5 AK |
| 3,242,109 | 3/1966 | Showalter | 260/2.5 AK |
| 3,377,411 | 4/1968 | Charvat | 260/215 AK |
| 3,608,008 | 9/1971 | Soukoup | 260/2.5 AZ |
| 3,644,168 | 2/1972 | Bonk | 264/45.5 |
| 3,728,288 | 4/1973 | Cobbs | 260/2.5 AZ |
| 3,745,203 | 7/1973 | Harper | 260/2.5 AZ |
| 3,786,121 | 1/1974 | Schaerer | 264/DIG. 14 |
| 4,005,035 | 1/1977 | Deaver | 260/205 AK |

FOREIGN PATENT DOCUMENTS

| | | | |
|---|---|---|---|
| 1148740 | 5/1963 | Fed. Rep. of Germany | 260/2.5 AK |
| 1160041 | 7/1969 | United Kingdom | 260/2.5 AZ |

*Primary Examiner*—H. S. Cockeram
*Attorney, Agent, or Firm*—Schmidt, Johnson, Hovey & Williams

[57] ABSTRACT

A molding composition is disclosed for forming in a single step a natural sandwich foam product having a cellular core and a thick, densified outer layer. A hard, particulate filler material such as fly ash is admixed with an unreacted, rigid polyurethane foam system, together with a density distribution control agent such as carbon tetrachloride which lowers the viscosity of the admixture. In molding, the mold cavity is charged with the admixture and the foam reaction is permitted to occur with the mold closed. The resultant, filled foam product has a thick outer layer formed adjacent the mold surface of substantially greater density than its core. In the densified layer, both the polyurethane and filler material components of the resultant product are concentrated to provide over three times the density of the core structure. Formulations are set forth which provide substantial layer thickness and an outer surface having a durometer hardness value of 50 or greater over the entire surface area. If desired, one or more barrier members may be provided in the mold cavity in order to cause the generation of a densified region in the resultant product at the pressure barrier during the foam reaction, thereby reinforcing the core to increase the structural strength of the product.

4 Claims, 4 Drawing Figures

NATURAL SANDWICH OF FILLED POLYURETHANE FOAM

CROSS-REFERENCE

This is a continuation of application Ser. No. 599,653, filed July 28, 1975, which was in turn a Continuation of application Ser. No. 346,912, filed Apr. 2, 1973, which was in turn a continuation-in-part of application Ser. No. 247,029, filed Apr. 24, 1972 all now abandoned.

This invention relates to improvements in polyurethane foams and processes for molding foams of this type and, in particular, to improvements in rigid polyurethane foams subject to environments in which resistance to structural loads and hard, durable outer surfaces are desirable.

Polyurethane foams are commonly prepared by reacting an isocyanate with a hydrogen-containing compound having a reactive hydroxyl group, such as a polyether polyol. The reaction occurs in the presence of a catalyst, and a blowing agent is provided in order to produce an expanded, cellular product. The blowing agent may be produced chemically by the interaction of the isocyanate with water to produce $CO_2$ gas, but preferably in low density, high expanding systems a blowing agent such as trichlorofluoromethane is added which vaporizes at the outset of the reaction. Low density systems are commercially available having a core density of two pounds per cubic foot and four pounds per cubic foot, when free blown by the trichlorofluoromethane agent. Such systems are commonly supplied in two components, the isocyanate component being maintained separate from the polyol-catalyst-blowing agent component until the time of use.

The employment of low density systems as a casting resin for rigid type polyurethane foams is advantageous in that the amount of polyurethane reactants required for a given mold volume is reduced, with a corresponding reduction in the cost of the molded product. However, the inherent reduction in density, although tolerable and even desirable in the core, creates a problem at the surface of the product since the surface is much less resistant to impact and abrasion. Accordingly, utilization of rigid, low density polyurethane foams in structural applications has been limited in some instances by this inherent surface defect.

In an effort to improve the physical characteristics of the surface, numerous approaches have been devised for forming a tough skin on a polyurethane foam integral with the low density core. These prior approaches include the self-generation of an integral skin during molding by cooling the mold surface, overfilling or overpacking the mold, or employing centrifugal force through continuous mold rotation to obtain a skin effect. However, it is believed that all of these prior techniques have inherent disadvantages, such as excessive cost of the product due to the increase in the amount of polyurethane material in the case of overfil molding, or the necessity of providing special equipment in the case of mold surface cooling or mold rotation.

It is, therefore, an important object of the present invention to provide a rigid polyurethane foam product having substantially increased density with a reduced quantity of polyurethane, and wherein the density of the product is concentrated adjacent the outer surface thereof to increase surface hardness and form a greatly densified outer layer of significant thickness.

It is another important object of the present invention to provide a molding composition and a molding process for polyurethane foams which both minimize the polyurethane content of the molded product and produce in situ a thick, greatly densified outer layer.

As a corollary to the foregoing object, it is an important aim of this invention to provide a composition and process as aforesaid in which the in situ generation of the densified outer layer is caused solely by the employment of additives in the foam system, and wherein no special mechanical means is required in connection with the molding apparatus in order to obtain the improved product.

Still another important object of this invention is to achieve a thick, densified outer layer as set forth above, while at the same time decreasing the quantity of reactive elements of the foam system required to mold a product of a given size and weight.

In this latter connection, it is a further important object of the invention to provide a molding composition and process as aforesaid wherein a filler material is employed to significantly reduce the cost of the molded product, increase its density, and enhance the density and hardness of the in situ generated outer layer.

Accordingly, it is yet another important object of the present invention to provide a natural sandwich from a filled, rigid polyurethane foam having both structural and cost advantages, and wherein the polyurethane and filler components of the product are concentrated adjacent the outer surface thereof, yet with such filler being distributed in the core of the product as well as the densified outer layer.

Additionally, it is an important object of this invention to provide a foam product as aforesaid having one or more internal regions of increased density in order to reinforce the core portion thereof, and it is a further objective to provide a method of forming such internal regions as the foam reaction occurs during the molding process.

Furthermore, it is an important object of this invention to provide a method of forming a densified outer layer as above with uniformity throughout the surface area, both in thickness and in hardness or resistance of the surface to impact or abrasion.

THE FOAM PRODUCT

Figure 1:
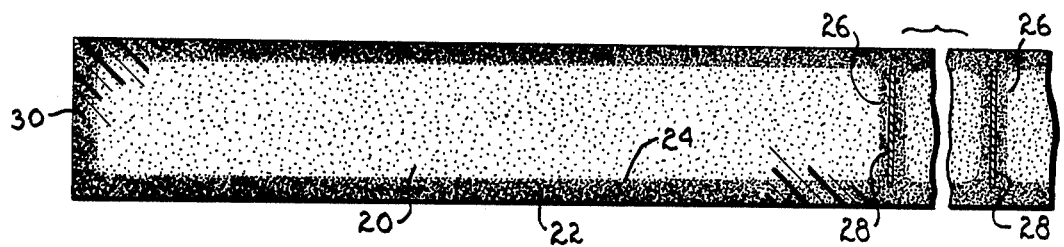
FIG. 1 is a fragmentary, cross-sectional view of a molded polyurethane foam wall panel made in accordance with the present invention.
Figure 2:
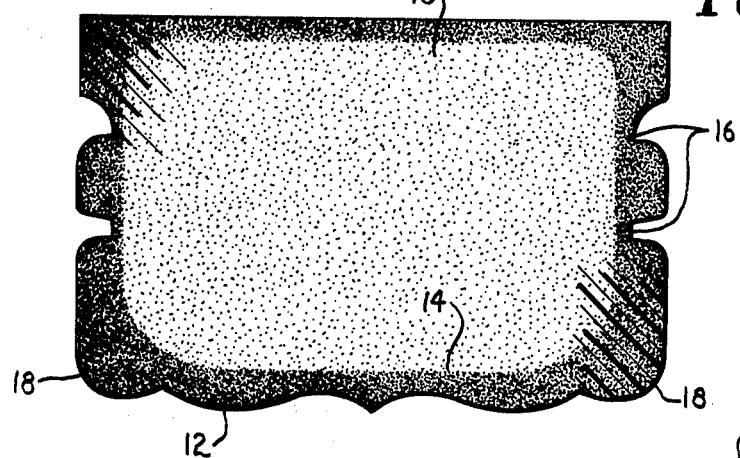
FIG. 2 is a cross-sectional view of an ornamental molding made in accordance with the present invention.
Figure 3:
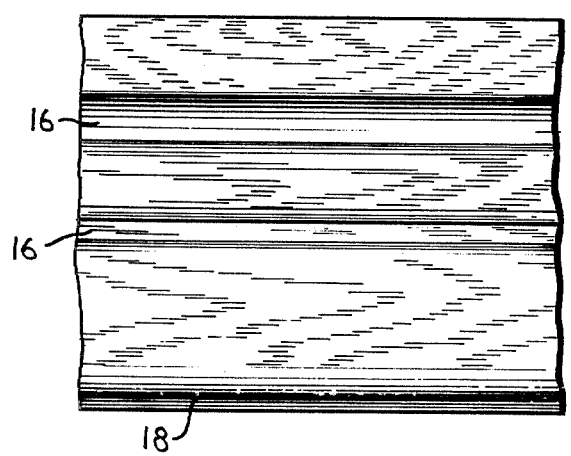
FIG. 3 is a fragmentary view of the exterior surface of the molding of FIG. 2, showing a wood-grain surface effect.

Two examples of molded polyurethane products made in accordance with the teachings of the present invention are illustrated in FIGS. 1-3. A wall panel is shown in FIG. 1 and may be suitably dimensioned for wall construction purposes. The cross section reveals the thickness of the article and a portion of its width. For example, suitable dimensions are eight feet in length (height when installed), four feet in width, and a thickness of three inches. This would provide a panel suitable for home and building construction having high structural strength in compression and the excellent insulating properties characteristic of expanded polyurethane. The article in FIG. 2 is a decorative molding as may be appreciated from the irregular surface contour.

Referring first in detail to FIG. 2, it may be seen that the molding has a relatively low density core 10 and a high density outer layer 12. The core 10 is characteristic of expanded polyurethane foam products, in that it comprises a substantially closed-cell, rigid structure in which the closed cells are formed by the blowing agent during molding. The layer 12 completely surrounds the core 10 and is integrally formed therewith, there being a rather pronounced line of demarcation 14 between the low density core 10 and the densified layer 12. The thickness of the layer is relatively uniform except for the re-entrants 16 formed by the grooves of the molding design, and the outwardly curving protuberances 18 which are particularly pronounced at the lower corners of the cross-sectional configuration.

The layer 12 has a closed-cell, rigid polyurethane structural like the core 10, but the cell size and spacing is less than in the core 10 in order to provide a density in the outer layer of from three to ten times the density of the core. An exception to the cellular structure of the layer 12 is the outer surface thereof which is smooth and void free.

A hard, particulate filler material is distributed throughout the core and outer layer structures by virtue of having been previously admixed with the reactive elements of the foam system prior to molding. This will be discussed fully in succeeding portions of the present specification. At this juncture, however, it is sufficient to appreciate that the filler content by weight percent is the same in the core 10 as in the layer 12. Accordingly, both the polyurethane and the filler components of the foam structure having substantially greater concentration in the layer 12. The significance of this is that the filler material contributes to the formation of the layer, and also increases the hardness of the outer surface thereof.

As is illustrated in FIG. 3, the hard outer surface may be provided with a wood grain effect in the molding of the article, or any other desired ornamental surface texture or appearance may be provided as is conventional in the plastic molding art. It is important to note in this respect that, although the core 10 is cellular and of relatively low density, the outer surface depicted in FIG. 3 has sufficient hardness to permit desired decorative surface effects to be imparted during molding. As will be fully discussed hereinbelow, the outer surface of the products of the present invention may be formed with a durometer hardness value of well over 50 throughout the surface area (65 to 80 is readily obtainable).

Referring to FIG. 1, it may be seen that the panel has a low density core 20 and a densified, natural outer portion 22 analogous to the core 10 and layer 12 of the decorative molding of FIG. 2 discussed above. The panel has the same structural characteristics, in that the core 20 and outer portion 22 comprise an expanded polyurethane formed in a closed mold cavity. Thus, the panel is a sandwich member, the core 20 being interposed between the major layers of the outer portion 22 that present the opposed faces of the panel. A hard, particulate filler material is admixed with the reactive elements of the foam system prior to the molding operation, and a rather pronounced line of demarcation 24 is produced indicating that the cellular structure undergoes a rapid increase in density at the boundary between the core 20 and the outer portion 22.

Other than its ultimate use and external appearance, the panel construction is also essentially the same as that of the decorative molding illustrated in FIGS. 2 and 3, except for internal reinforcement of the core 20 provided by two densified regions 26. Each of the densified regions 26 is formed around a barrier member 28 in the nature of a thin strip of metal, cardboard or other barrier-forming material extending the length of the panel. The two strips 28 are placed in the mold cavity and positioned in accordance with the desired locations of the regions 26 in the finished, molded product. In the present example assuming that the wall panel has a width of four feet, the two strips 28 could be located on sixteen inch centers with the longitudinal edges 30 of the panel, thereby providing reinforcement for the panel core 20 at intervals sixteen inches apart from one longitudinal edge to the other (the minor stretches of outer portion 22 at the longitudinal edges 30 also serve as reinforcement). As foaming occurs during the molding process, each of the strips 28 provides a pressure barrier in a manner analogous to the mold surfaces defining the closed mold cavity. Accordingly, the region 26 formed on the strip 28 is in the nature of an internal, densified layer bridging the opposed major layers of the outer portion 22 that present the major surfaces of the panel. In effect, herefore, the core 20 is divided into three sections, the center section being bounded by the two regions 26 and each end section being bounded by one of the regions 26 and the corresponding longitudinal edge 30. The thickness of the internal skin formed on one surface or side of the associated strip 28 in the article depicted in FIG. 1 is on the order of ⅛ inch, whereas the thickness of each of the major layers presented by outer portion 22 is somewhat over ¼ inch. It should be understood, however, that a foraminous material such as strips of wire screen could also be employed as the barrier members 28, with the result that the densified regions 26 would be appreciably thicker (although of lesser density) and would be the result of a gradual densification without the observable lines of demarcation. Accordingly, the internal densified layers of the pesent invention have a density and delineation to the extent that the members 28 provide an effective barrier to the expanding foam.

It should be understood that the thickness of the outer portion 22 of the natural sandwich member will vary depending on the thickness of the member and the particular molding composition utilized (formulations are set forth hereinafter). The wall panel of FIG. 1 is a typical example, being three inches in total thickness and assuming a layer thickness of ⅜ inch. Thus, the thickness of the core 20 between the opposed major surfaces is 2¼ inches, and the combined thickness of the outer layers is ¾ inch. This is a ratio of core thickness to layer thickness between the surfaces of 3:1. The thickness of the densified outer layer increases with panel thickness and/or filler content. However, core thickness will normally increase in greater proportion, thus thicker sandwich panels may have a core to layer thickness ratio up to approximately 10:1. On the other extreme, very thin panels (on the order of one inch from surface to surface) may be produced with very thick densified surface layers relative to the core, resulting in low core to layer thickness ratios on the order of 1:2.

THE PROCESS AND MOLDING COMPOSITIONS

In the present invention, a molding composition is employed comprising a foam-producing system plus additives that cause the system to produce a natural sandwich product during the molding operation. Conventional two-pound and four-pound systems are preferred, but the teachings of the present invention are also applicable to higher density systems which utilize greater amounts of the unreacted, polyurethane-forming elements in relation to the blowing agent. The additives comprise a hard, particulate filler material and a density distribution control agent to be discussed in detail.

It should be understood that a "two-pound system" as used herein refers to a foam-producing system which will produce an expanded, rigid polyurethane product having a density of two pounds per cubic foot when free blown (free rise density). In a four-pound system, a lesser relative quantity of blowing agent is utilized, thus the nomenclature refers to a foam product having a free rise density of four pounds per cubic foot. Systems of this type are commonly supplied in two components which are not mixed until just prior to charging the mold. One component is the isocyanate, and the other component is the polyol together with a catalyst and a suitable blowing agent. Such systems are employed as casting resins for rigid type polyurethane foams and, particularly in the lower density systems, the blowing agent is commonly trichlorofluoromethane which vaporizes at well below the temperature reached during the reaction of the isocyanate and polyol occurring after they are admixed. The reaction is exothermic and thus supplies the heat for vaporization of the blowing agent necessary to form the expanded foam product.

The filler material should not be chemically reactive with the isocyanate or polyol to any significant degree, and thus an inorganic material is preferred which does not cause an inordinate increase in the viscosity of the component (or admixed components) to which it is added. In this latter regard, it should be understood that the components of the foam-producing composition are liquids prior to mixing, thus substantial increases in the viscosity of either component or the admixed components caused by the filler material are ideally avoided. In general, the smaller the particle, the higher the viscosity of a liquid in which is dispersed a given quantity by weight of the filler material. Accordingly, larger particle sizes are preferred so long as the particle is not so large as to interfere significantly with the formation of the cellular polyurethane structure. Small particle sizes tend to increase the viscosity of the foamable liquid when the filler additive is admixed therewith in significant quantities, thus a filler having a small particle size may increase the viscosity of the admixture to such an extent that it can no longer be readily handled and becomes unsuitable as a molding composition.

Examples of materials suitable as the filler in the present invention include a number of inorganic materials such as fly ash and various glass compositions, and specific compounds such as calcium carbonate ($CaCO_3$), silicon dioxide ($SiO_2$), and the oxides of iron. Calcium carbonate may be in the form of ground calcite, silicon dioxide may be ground quartz or sand, and iron oxides may be obtained from naturally occurring hematite ($Fe_2O_3$) and magnetite ($Fe_3O_4$). Other suitable natural minerals include feldspar, dolomite, barite and anhydrite. The filler material should be nonflammable. Furthermore, for fire retardacy, materials preferred for this quality include raw volcanic ash, hydrated calcium sulfate, and hydrated aluminum oxide. A particle size of from 40 to 200 microns or somewhat larger is preferred, with particle sizes in excess of 200 microns being usable as long as the filler does not substantially impede the formation of the cellular polyurethane structure.

The density distribution control agent is an organic liquid at room temperature which is chemically unreactive with the polyurethane-forming elements of the foam system. Examples of suitable agents include carbon tetrachloride ($CCl_4$) which has a boiling point of approximately 77° C., trichloroethylene ($CHCl{:}CCl_2$) which has a boiling point of approximately 87° C., methylene chloride (dichloromethane) which has a boiling point of approximately 40° C., chloroform ($CHCl_3$) having a boiling point of 61° C., methylchloroform (1,1,1-trichloroethane) which boils at approximately 74° C., perchloroethylene (tetrachloroethene) which boils at approximately 121° C., and ethyl acetate which boils at approximately 77° C. The halocarbons are preferred due to their natural fire retardancy and self-extinguishing characteristics, particularly carbon tetrachloride.

The characterizing parameters of the control agent, besides being liquid at room temperature, are that it must be chemically unreactive with the isocyanate and polyol elements of the foam system and soluble therein, with a boiling point of approximately 40° C. or greater. Furthermore, the control agent must not influence the catalyst so as to significantly accelerate or decelerate the reaction of the polyurethane-forming elements, and should have a low viscosity in order to render it capable of reducing the viscosity of the mixture of the foam system and filler material. It is believed that the viscosity reduction obtained through use of the control agent is instrumental in the formation of the thick, densified outer layer during the foam reaction. The use of more volatile agents (boiling points significantly under 40° C.) causes an undue increase in the pressure within the mold, with the attendant possibility that the resultant product could have dimensional instability under ambient temperature extremes that would result in damage to the product through warpage or fracture.

Both the filler material and the control agent reduce the temperature of the foam reaction within the mold as compared with molding compositions not employing the additives of the present invention (heavily loaded formulaions may not reach 200° F. during the exothermic foaming reaction). Furthermore, the presence of the filler also reduces the pressure reached during the foam reaction. These are beneficial by-products of the invention. Since the filler effects a pressure reduction, the addition of a volatile control agent is possible without creating an extreme pressure condition, so long as its volatility is restricted as discussed above and a minor proportion by weight of the agent is used in the molding composition (specific examples are set forth hereinafter).

It should also be noted in the examples to follow that the amount of filler material in the molding composition is substantial, on the order of one-half of the composition by weight as will be discussed, which would in many instances make the composition too viscous to handle in the absence of the density distribution control agent. The cooperative action of the agent and the relatively large quantity of filler material results in the formation of a very hard outer surface and a thick, densified outer layer. In this respect, it is important that the filler material have a sufficient particle size to eliminate problems of viscosity increase discussed above so that the requisite quantity of filler may be employed in the formulation. The predominant particle size of the filler should ideally be at least approxiately 40 microns, since large amounts of smaller particles (generally under 10 microns) will raise the viscosity to the point that the desired filler content may be difficult to maintain. As an example, it has been found that gypsum plaster (hydrous calcium sulphate) having the following range of particle sizes in a usable filler:

| Particle Size In Microns | Percent By Weight Of Total Material |
| --- | --- |
| Less Than 149 | 99.5% |
| Less Than 105 | 98.7 |
| Less Than 74 | 95.4 |
| Less Than 44 | 86.6 |
| Less Than 37 | 77.2 |
| Less Than 30 | 70.8 |
| Less Than 20 | 54.0 |
| Less Than 10 | 32.2 |

Gypsum filler material having this range of particle sizes may be admixed with the unreacted polyurethane foam components in a ratio of 1:1 although a more viscous composition is produced than is preferred, but the greater viscosity does not preclude use of the admixture as a practical molding composition.

To prepare the molding composition of the present invention, mechanical impeller-type mixers may be employed in a two-step mixing operation. The two components of the foam system and the control agent are mixed first, and then the filler material is added. This may be accomplished in an in-line mixing operation with the first mixer being employed for the foam system and control agent. The second mixer receives the admixed system and agent and adds the filler which may be metered into the mixer by an auger or other suitable means. It is important that the filler be thoroughly admixed with the isocyanate and polyol elements of the foam system so that the filler will be uniformly dispersed throughout the foamable liquid composition. Such admixture is transferred directly from the second mixer to the mold in order to charge the latter before the reaction commences.

A number of exemplary molding formulations follow. Component A is the isocyanate, and component B is the polyol with blowing agent and catalyst. All of the examples are expressed in terms of parts by weight with component A and component B normally being mixed in approximately a 1:1 ratio.

EXAMPLE I

Components A and B: 50 parts
Filler: 50 parts
Control Agent: 5 parts

Example I is a preferred formulation utilizing a four to eight-pound polyurethane foam system in order to provide a superior natural sandwich product for structural applications, such as entrance doors and structural as well as decorative wall panels. The ratio of the weight of the filler to the weight of the foam system is 1:1, and the admixed composition has sufficiently low viscosity to be readily handled in molding operations.

EXAMPLE II

Components A and B: 60 parts
Filler: 40 parts
Control Agent: 5 parts

Example II is a formulation utilizing a two-pound, highly expanding foam system with a lesser filler loading to achieve a product of relatively light weight. Although the densified outer layer of the product may be thinner than in more heavily loaded formulations, a durable, high-density outer layer is nonetheless formed. The formulations would find particular use, for example, in the molding of decorative appliques and non-structural furniture parts.

EXAMPLE III

Components A and B: 30 parts
Filler: 60 parts
Control Agent: 5 parts

Example III employs a two-pound foam system as in Example II, but a heavy filler loading (2:1 ratio of filler to foam system) is utilized to enhance certain structural characteristics of the molded part. The product has a highly insulating core with great contrast between surface density and core density and is characterized by a very thick, durable outer layer. This formulation is useful in such applications as the molding of non-structural wall panels where superior insulating properties and a durable outer surface are desired.

EXAMPLE IV

Components A and B: 50 parts
Filler: 50 parts

Although the formulation of Example IV is not as desirable due to the omission of the density distribution control agent, it does represent a cost saving factor of 50% as compared with utilizing unloaded polyurethane to achieve the same part weight. The filler must be selected so as to not increase the viscosity of the admixture to the point that it is unworkable. Accordingly, a two-pound density foam system is preferred. Fillers such as banding sand and fly ash, for example, are suitable. Generally speaking, the selected filler should have particle sizes conforming to the preferred range set forth above (approximately 40 microns or greater).

With respect to all of the foregoing examples, the quantity of the molding composition utlized may be equal to approxiately 40% of the volume of the mold cavity into which the composition is to be charged, but this can be varied greatly from application to application depending on the desired overall product density. As will be discussed subsequently when experimental results are set forth, enhancement of the densified outer layer by way of both uniformity in thickness and surface hardness may be obtained by inverting the mold during the foam reaction.

A general formulation for the molding composition of the present invention comprises an admixture of a foam system as defined above present in from approximately 20 to 75 parts by weight, a filler material as previously defined present in from approximately 25 to 80 parts by weight, and a density distribution control agent present in from approximately 3 to 12 parts by weight. This provides a ratio by weight of filler material to polyurethane in the range of approximately 1:3 to 4:1. Fillers having large particle sizes (on the order of 200 microns or greater) may be advantageously employed for the very heavy loadings over 2:1 due to the decreased viscosity.

As the foam reaction occurs within the mold cavity, the expanded, cellular polyurethane structure is formed in the usual manner by the action of the blowing agent of the foam system. The closed mold cavity is, of course, defined by a surrounding mold surface that serves as a barrier to the expanding polyurethane during the foam reaction. It is believed that the reduced viscosity of the admixture attained through use of the control agent assists the greatly densified layer effect of the present invention since the cell walls of the polyurethane structure are thinner just prior to gelation, resulting in greater expansion in the core with corresponding concentration of the density of the product adjacent the surrounding mold surface. Due to the action of the filler and control agent additives of the present invention, the net result is to form a natural sandwich product as previously described with reference to FIGS. 1–3 wherein the core of the product has a relatively low density as would be expected, but with the addition of a thick and greatly densified outer layer formed adjacent the mold surface. Both the polyurethane and the filler components of the foam structure are more greatly concentrated in the outer layer than in the core, as evidenced by the fact that the filler content by weight percent is the same throughout both the core and the outer layer of the molded product. Accordingly, not only the cellular polyurethane structure, but also the particulate filler is concentrated in the outer region. It has been found that this contributes to the formation of the densified layer and also increases the hardness of its outer surface.

PHYSICAL PROPERTIES OF THE PRODUCT

Table I sets forth the formulations employed in twenty-two tests of molded products of the present invention, which were run to determine the physical properties of the outer layer in terms of thickness, durometer hardness values, and uniformity of the results obtained. The physical parameters of the test pieces are set forth in Table II, and such pieces are correlated with the formulations of Table I by the test numbers appearing in the left-hand columns of both tables.

TABLE I

COMPOSITION AND CONDITIONS EMPLOYED IN POLYURETHANE TEST PIECES
(Values given are in grams)

| Test No.* | Foam Type | Comp. "A" | Comp. "B" | Ash | $CaCO_3$ pptd | $CaCO_3$ 200 mesh | $CCl_4$ | $CHCl:CCl_2$ | Diesel Fuel |
|---|---|---|---|---|---|---|---|---|---|
| 1 | 4 lb. | 74.0 | 74.0 | — | — | — | — | — | — |
| 2 | 4 lb. | 74.0 | 74.0 | — | — | — | 9.0 | — | — |
| 3 | 4 lb. | 74.0 | 74.0 | 74.0 | — | — | — | — | — |
| 4 | 4 lb. | 74.0 | 74.0 | 74.0 | — | — | 9.0 | — | — |
| 5 | 4 lb. | 74.0 | 74.0 | 74.0 | — | — | 9.0 | — | 1.0 |
| 6 | 4 lb. | 74.0 | 74.0 | — | 37.0 | — | — | — | — |
| 7 | 4 lb. | 74.0 | 74.0 | — | 37.0 | — | 9.0 | — | — |
| 8 | 4 lb. | 74.0 | 74.0 | — | 37.0 | — | 9.0 | — | 1.0 |
| 9 | 4 lb. | 74.0 | 74.0 | — | — | — | — | 9.0 | — |
| 10 | 4 lb. | 74.0 | 74.0 | 74.0 | — | — | — | 9.0 | — |
| 11 | 4 lb. | 74.0 | 74.0 | 148.0 | — | — | 18.0 | — | 9.0 |
| 12 | 4 lb. | 74.0 | 74.0 | 148.0 | — | — | 18.0 | — | 3.0 |
| 13 | 4 lb. | 74.0 | 74.0 | 74.0 | — | — | 9.0 | — | 1.0 |
| 14 | 10 lb. | 74.0 | 74.0 | 148.0 | — | — | 18.0 | — | 3.0 |
| 15 | 4 lb. | 74.2 | 74.0 | — | — | 74.0 | 9.7 | — | 1.0 |
| 16 | 2 lb. | 149.1 | 149.0 | — | — | — | — | — | — |
| 17 | 2 lb. | 148.0 | 149.8 | 148.0 | — | — | 18.0 | — | — |
| 18** | 2 lb. | 148.0 | 148.0 | 148.0 | — | — | 18.0 | — | — |
| 19** | 2 lb. | 148.0 | 148.0 | 314.0 | — | — | 18.0 | — | — |
| 20** | 2 lb. | 148.0 | 148.0 | 498.0 | — | — | 36.0 | — | — |
| 21 | 4 lb. | 74.1 | 74.0 | 75.1 | — | — | 9.0 | — | — |
| 22*** | 2 lb. | 148.4 | 148.0 | 498.0 | — | — | 55.0 | — | — |

*Tests #1–#13 were run with components A & B at 85° F. All others at 76° F.
**Mold reversed 180 degrees after expulsion of air thru vent hole of mold.
***Mold reversed 180 degrees 5 minutes after expulsion of air thru vent hole of mold.

TABLE II

PHYSICAL PARAMETERS OF TEST PIECES

| Test No. | Hardness Values | | | Weight of Piece, gms. | Densified Outer Layer Thickness, mm. |
|---|---|---|---|---|---|
| | Top | Side | Bottom | | |
| 1 | 25 | 46 | 59 | 126.8 | 1–3 |
| 2 | 29 | 45 | 71 | 133.3 | 1–4 |
| 3 | 37 | 54 | 57 | 192.5 | 1–4 |
| 4 | 38 | 63 | 72 | 203.9 | 1–4 |
| 5 | 39 | 64 | 71 | 204.3 | 1–4 |
| 6 | 30 | 45 | 53 | 134.3 | 1–3 |
| 7 | 43 | 56 | 58 | 143.2 | 1–3 |
| 8 | 46 | 53 | 56 | 147.2 | 1–3 |
| 9 | 34 | 43 | 80 | 122.4 | 1–3 |
| 10 | 49 | 57 | 72 | 187.1 | 1–4 |
| 11 | 59 | 64 | 71 | 281.3 | 1–5 |
| 12 | 60 | 65 | 69 | — | 1–4 |
| 13 | 28 | 61 | 72 | 203.0 | 1–9 |
| 14 | 22 | 34 | 37 | 269.5 | 0–1 |
| 15 | 36 | 62 | 64 | 211.5 | 1–5 |
| 16 | 49 | 73 | 81 | 232.6 | 1–9 |
| 17 | 70 | 78 | 78 | 393.5 | 1–10 |
| 18 | 58 | 68 | 70 | 326.0 | 2–6 |
| 19 | 57 | 74 | 74 | 485.4 | 2.5–8 |
| 20 | 49 | 59 | 59 | 587.8 | 2.5–13 |
| 21 | 31 | 61 | 65 | 207.3 | 1–6 |
| 22 | 69 | 77 | 79 | 697.3 | 2–19 |

Figure 4:
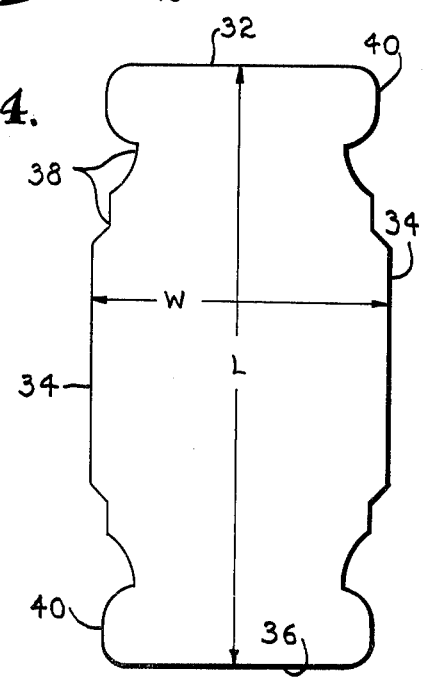
FIG. 4 is a diagrammatic view showing the outline of the cross section of molded test pieces discussed in the detailed specification to follow.

Each of the test pieces had a longitudinal cross-sectional configuration illustrated in FIG. 4 (the figure shows the outline of the cross section). The volume of the mold cavity was 48.5 cubic inches, and the resultant mold piece had a length of approximately 6½ inches and a width of 3¼ inches, as represented by "L" and "W" in FIG. 4. The thickness of each piece was approximately 2¼ inches.

Tests 1–13, 15 and 21 utilized a four-pound foam system; component A thereof is a crude diphenylmethane diisocyanate and component B is a polyether polyol, plus trichlorofluoromethane (blowing agent) and a catalyst. The two-pound foam system used in tests 16–20 and 22 employed tolylene diisocyanate as component A and a polyether polyol as component B with a catalyst and a greater quantity of the trichlorofluoromethane blowing agent. The ten-pound foam system utilized in test 14 employed a modified diphenylmethane diisocyanate as component A, and a component B comprising essentially a polyether polyol with some water present, plus a catalyst. The ten-pound system is of the $CO_2$-blown type; the water present in component B enters into the reaction of the isocyanate and OH groups to liberate the $CO_2$ blowing agent.

The fly ash ("Ash" in Table I) in the test formulations was analyzed by X-ray diffraction to determine the compounds present. The major component was an amorphous (noncrystalline) mixture of silicon-aluminum-calcium-potassium-oxide, i.e. glass. $Fe_3O_4$ and alpha-$SiO_2$ (quartz) were also present. A spectrographic analysis of the fly ash is set forth in Table III.

TABLE III

| Spectrographic Analysis (semi-quantitative) | |
|---|---|
| Element | Weight Percent |
| Aluminum | 8.0 |
| Barium | 0.02 |
| Calcium | 3.0 |
| Copper | 0.006 |
| Iron | 10. |
| Lead | 0.05 |
| Manganese | 0.03 |
| Nickel | 0.01 |
| Potassium | 2. |
| Rubidium | 0.005 |
| Silicon | 25. |
| Strontium | 0.03 |
| Sulfur | 0.3 |
| Titanium | 0.5 |
| Vanadium | 0.02 |
| Yttrium | 0.005 |
| Zinc | 0.3 |
| Zirconium | 0.01 |

As indicated in Table I and as will be discussed, calcium carbonate ($CaCO_3$) was substituted for fly ash in several of the tests. The column headed "$CaCO_3$ pptd" refers to precipitated calcium carbonate, while the column headed "$CaCO_3$ 200 mesh" refers to calcium carbonate ground from calcite to minus 200 mesh (less than 74 microns).

The columns in Table I indicating quantities of $CCl_4$ or $CHCl:CCl_2$ represent the type and amount of density distribution control agent utilized in the various tests. The right-hand column indicates the quantity of diesel fuel added in some tests to determine if this additive had any measurable effect on surface hardness.

In all tests, the additives were combined with component A of the foam system and thoroughly mixed with a high speed hand drill mixer blade. The B component was then metered into the A plus additives mixture in amounts equal to the A component weight and thoroughly mixed.

The toal mixture was immediately poured (the reaction commences in approximately one minute after the A and B components are combined) into the top end of a two-piece RTV (room temperature vulcanizing) rubber mold, the surface of which had been treated with a light coating of a release agent. The mold was closed with a top containing an air vent hole. After expulsion of the air from the mold cavity, indicated by ejection of the foaming polyurethane through the vent, the vent hole was closed. In tests 20 and 22 the mold cavity was filled approximately two-thirds full with the molding composition; in tests 17 and 18 the mold cavity was approximately half full. In the tests such as 1 through 15 employing lesser amounts of components A and B, the mold was under half full. (In some of the heavier formulations of the later tests, the mold cavity was not charged with the entire quantity of prepared molding composition, thus some of the variation in the weights of the finished pieces are attributable to this.)

Time in the mold varied from fifteen to thirty minutes depending on the quantity of additives in the mixture. The larger the quantity of fly ash, the longer the mold time required.

After demold, each test piece was permitted to cool and weighed, and was then cut in half parallel to the longitudinal dimension and examined for external and internal appearance. Hardness of the external surface was determined by a maximum reading durometer (the instrument utilized conforms to ASTM D2240 and was a Shore durometer, Type D, made by the Shore Instrument and Manufacturing Company of Jamaica, New York). The distribution of outer layer thickness variations within each piece was determined. In all tests, the appearance of the pieces was excellent; the other physical parameters are set forth in Table II.

The results of the tests to now be discussed are based on the data compiled in Tables I and II. Examination of the hardness values presented in Table II shows that differential hardness exits over different surfaces of a number of the test pieces. In general, the top surface of each piece was found to have the lowest hardness value as a result of conventional molding practice. Since the foamable liquid admixture is poured into the mold from the top, the initially reacted polyurethane, together with entrapped gas rises to the top of the mold while the balance of the liquid admixture is compressed downward. This downward compression of the as yet unreacted liquid results in a densification of the surfaces in the lower portion of the piece. However, attention is directed to tests 18–20 and 22 where the mold was reversed 180° (inverted) during the foam reaction. As compared with most of the other tests where the mold remained in the same position, the difference between the three hardness values is significantly less. Accordingly, inverting the mold resulted in greater uniformity of the hardness values of the outer surface.

The outer surfaces referred to in Table II may be identified with reference to FIG. 4. The top surface is identified by the reference numeral 32, the side surfaces are identified by 34, and the bottom surface is 36. Note the re-entrants 38 and the outwardly curving protuberances 40 formed by the mold configuration.

Further examination of the data in Table II pertaining to the thickness of the densified outer layer reveals that a certain degree of nonuniformity exists in all tests. In those tests were the mold was not inverted, it was observed that the thicker layer tended to develop on the bottom surface of the piece as would be expected from the previous discussion of surface hardness variation. Furthermore, the outer layer tended to thicken in areas associated with the protuberances 40, and development of the densified layer in the area of the sharply pointed re-entrants 38 was noticeably reduced. However, inverting the mold immediately after expulsion the air therefrom (tests 18–20) materially decreased the variation in thickness from the minimum at the re-entrants 38 to the maximum at the protuberances 40, resulting in a more uniform thickness having an average value approxiately midway in the range for each test set forth in Table II. This may be seen by comparing tests 17 and 18 in which the same formulations were employed, but without inverting the mold in test 17. The layer thickness variation was reduced from 1 to 10 mm. (test 17) to 2 to 6 mm. (test 18). The layers present on the top and bottom of the piece in test 18 were nearly equal in thickness (2 mm.), with the thickest layer being associated with the protuberances 40 near the top and bottom of the piece.

The effect of the additives may be observed from a number of comparisons. First, the isolated effect of the $CCl_4$ control agent is shown by comparing tests 1 and 2. It is evident that $CCl_4$ has to some extent increased the hardness of the blank polyurethane (test 1). It is believed that the $CCl_4$ is retained in the closed cells of the foam structure and adsorbed as is the case with the blowing agent provided in component B, trichlorofluoromethane ($CCl_3F$). The effect of the addition of fly ash to the blank polyurethane may be seen by a comparison of tests 1 and 3. The weight of the piece has increased, a slightly thicker outer layer has been obtained, and the differential hardness of the three surfaces is reduced.

The combined effect of the fly ash and $CCl_4$ additives is shown by comparing these previous tests with test 4. It is evident that the use of both additives has brought about a dramatic improvement in the hardness values, resulting in the formation of a useful outer layer. In tests 5, 8 and 11-15, diesel fuel was also employed as an additive but without significant improvement in the surface hardness of the test pieces.

It should also be noted in Table I that calcium carbonate was substituted for fly ash in several of the tests as mentioned above. Neither fly ash nor calcium carbonate are believed to enter directly into the isocyanate-polyol reaction. It was found from the tests as may be observed in Table II that the calcium carbonate is as effective as fly ash in developing the integral layer.

Calcium carbonate in the ground calcite form (200 mesh) is preferred over the precipitated calcium carbonate since the viscosity of the liquid admixture becomes quite high in the case of the precipitated $CaCO_3$. As discussed previously in this specification, the particle size of the filler material should not be so small as to create a viscosity problem as in the case of the small particles constituting $CaCO_3$ in precipitate form. It may be noted that the quantity of precipitated $CaCO_3$ in tests 6-8 is half that of the fly ash in comparble formulations, such reduction being necessitated by the high viscosity problem encountered when an attempt was made to substitute the precipitated $CaCO_3$ for fly ash on an equal quantity basis.

The effect of substituting trichloroethylene ($CHCl:CCl_2$) for carbon tetrachloride ($CCl_4$) is evident from a comparison of tests 2 and 9, and 4 and 10. Examination of Table I indicates that tests 9 and 10 are compositional equivalents of tests 2 and 4 respectively with the exception that trichloroethylene has been substituted for $CCl_4$. Other nonreactive organic liquids have the properties set forth earlier in this specification, particularly the halocarbons, may also be substituted for $CCl_4$.

Insofar as the effect of changing the foam system is concerned, the data indicates that both two-pound and four-pound systems are quite satisfactory. As previously discussed, these systems are blown by an agent such as trichflorofluoromethane present in component B. The less expansive, ten-pound system (test 14) is a $CO_2$-blown polyurethane system with significantly reduced expansion capabilities, thus 18 grams of $CCl_4$ in this test failed to produce a significant outer layer. However, satisfactory outer layers may be readily produced with higher density systems including those that are $CO_2$ blown. Due to the higher density core produced by such systems, the lines of demarcation 24 and 14 shown in FIGS. 1 and 2 are not as pronounced.

With reference to test A, the resultant piece was examined to determine the percent by weight of fly ash in the core and in the outer layer, and the relative densities of the core and outer layer. A core sample taken from the center of the piece was found to have a density of 13.13 pounds per cubic foot, while a sample of the outer layer taken from the side of the piece had a density of 47.45 pounds per cubic foot. In the core sample, the percentage of fly ash by weight was 31.98%; in the side layer samples, 31.31% and in a sample of the outer layer taken from the bottom of the piece, 32.91%. Accordingly, the density of the side layer was approximately 3.6 times that of the core, and fly ash content was essentially constant throughout the piece.

As is apparent from examination of the data for individual tests in both Table I and Table II, the thicker outer layers formed in accordance with the teachings of the present invention are associated with those formulations which contain the higher fly ash content (test 17-20 and 22). It is also apparent that an adequate amount of the control agent should be added to the formulation to compensate for the extra weight of the filler added to the isocyanate-polyol mixture. The benefit of an adequate amount of $CCl_4$ is illustrated by a comparison of the hardness values for tests 20 and 22. In the test formulations, the weight percent of control agent varies from approximately 3% to 6% of the total weight of the admixture.

It should be understood that the temperature of the A and B components of 85° F. in tests 1-13 is not preferred, since this is above the boiling point of the trichlorofluoromethane present in component B. This could cause some loss of the blowing agent before the mold is charged with the admixture, thus cool room temperature conditions are preferred (or conditions recommended by the polyurethane component supplier).

Having thus described the invention, what is claimed as new and desired to be secured by Letters Patent is:

1. A process of preparing a molded, integral-skin, filled foam product comprising the steps of:
   providing a mold presenting an enclosed molding cavity;
   charging said cavity with a foamable molding composition which comprises
   a polyurethane composition designed to yield rigid and products and which comprises an isocyanate, a polyol, and a blowing agent;
   an inorganic, particulate filler material which is substantially chemically unreactive with said isocyanate and polyol, the major proportion by weight of said filler material having a diameter of at least about 10 microns; and
   a density distribution control agent which is liquid at room temperature, substantially chemically unreactive with said isocyanate and polyol and soluble in said foamable composition, does not significantly accelerate or decelerate the reaction between the components of said foamable composition, and serves to reduce the viscosity of said foamable composition with said filler material therein, said density distribution control agent being selected from the group consisting of carbon tetrachloride, trichloroethylene, chloroform, methylchloroform, perchloroethylene and ethyl acetate, said foamable composition including from about 20 to 75 parts by weight of said polyurethane composition, from about 25 to 80 parts by weight of said filler, and from about 3 to 12 parts by weight of said density distribution control agent, the ratio by weight of filler material to polyurethane molding composition being in the range of approximately 1:3 to 4:1;

causing said foamable composition to react within said mold to create a hardened product, said filler and density distribution control agent serving, during said reaction, to cooperatively reduce the temperature of reaction to a level for preventing an excessive increase in the pressure within said mold over that provided by the blowing agent, the reduced viscosity of said foamable composition derived from the use of said density distribution control agent therein serving, during said reaction, to reduce the thickness of cell walls formed just prior to gelation, in order to cause a greater expansion in the central area of the mold cavity and a corresonding concentration of material in the regions of said cavity adjacent the mold walls, said reaction being carried out such that said product has a rigid, closed cellular core, a rigid, closed cellular outer portion, at least a pair of opposed outer layers, and a very thin, rigid, essentially void-free outer surface, said core having a first density, a first average cell size, and respective first concentrations of polyurethane material and filler material, said outer portion having a second density which is at least about three to ten times as great as said first density, a second average cell size less than said first average cell size, and respective second concentrations of polyurethane material and filler material which are substantially greater than the corresponding first concentrations, the percent by weight of said filler material in said product being substantially the same in both said core and outer portion, the ratio of the thickness of said core to the combined thicknesses of said opposed layers being in the range of approximately 10:1 to 1:2, said outer surface having a durometer hardness value of at least approximately 50 throughout its area.

2. The process as set forth in claim 1, wherein the thickness of each of said outer layers is from about one to nineteen millimeters.

3. The process as set forth in claim 1, wherein said filler material is selected from the group consisting of calcium carbonate, silicon dioxide, the iron oxides, feldspar, dolomite, borite, anhydrite, volcanic ash, hydrated calcium sulfate, and hydrated aluminum oxide.

4. The process as set forth in claim 1 including the step of placing a barrier member within said cavity such that said member is located within said core, there being an internal layer formed adjacent thereto which is integral with said core, said internal layer being of greater density than said core.

* * * * *